United States Patent
Weidner et al.

(10) Patent No.: US 12,552,012 B2
(45) Date of Patent: Feb. 17, 2026

(54) EXOSKELETON HAVING A PNEUMATIC ACTUATOR

(71) Applicant: EXOIQ GmbH, Hamburg (DE)

(72) Inventors: Robert Weidner, Gerdau (DE); Bernward Otten, Hamburg (DE)

(73) Assignee: EXOIQ GmbH, Hamburg (DE)

( * ) Notice: Subject to any disclaimer, the term of this patent is extended or adjusted under 35 U.S.C. 154(b) by 1076 days.

(21) Appl. No.: 17/626,088

(22) PCT Filed: Jul. 7, 2020

(86) PCT No.: PCT/EP2020/069151
§ 371 (c)(1),
(2) Date: Jan. 10, 2022

(87) PCT Pub. No.: WO2021/008948
PCT Pub. Date: Jan. 21, 2021

(65) Prior Publication Data
US 2022/0258328 A1    Aug. 18, 2022

(30) Foreign Application Priority Data
Jul. 12, 2019    (DE) ..................... 10 2019 119 033.9

(51) Int. Cl.
*B25J 9/00*    (2006.01)
*B25J 9/14*    (2006.01)

(52) U.S. Cl.
CPC ............... *B25J 9/0006* (2013.01); *B25J 9/14* (2013.01)

(58) Field of Classification Search
CPC ... B25J 9/0006; B25J 9/14; B25J 9/142; B25J 9/144; B25J 15/0658; A61H 1/0274;
(Continued)

(56) References Cited

U.S. PATENT DOCUMENTS 5,662,693 A * 9/1997 Johnson .................... A61F 5/01
607/48
2015/0321342 A1* 11/2015 Smith ...................... A61H 3/00
74/490.03
(Continued)

FOREIGN PATENT DOCUMENTS

CA        2 734 469 C    6/2016
DE    102008045113 A1    3/2010
(Continued)

OTHER PUBLICATIONS

International Search Report and Written Opinion dated Feb. 22, 2021, issued in PCT Application No. PCT/EP2020/069151, filed Jul. 7, 2020.

*Primary Examiner* — Joseph D. Boecker
*Assistant Examiner* — Brian T Khong
(74) *Attorney, Agent, or Firm* — Workman Nydegger (57) ABSTRACT

An exoskeleton is disclosed having a first exoskeleton element, a second exoskeleton element and a pneumatic actuator which is mechanically connected to the first exoskeleton element and the second exoskeleton element. The exoskeleton further comprises a control unit which is arranged to switch, when the first pneumatic actuator is controlled, between a first active support mode and a first passive support mode in which the first pneumatic actuator is not vented to the environment.

8 Claims, 6 Drawing Sheets

(58) Field of Classification Search
CPC .. A61H 1/0277; A61H 1/0281; A61H 1/0285; A61H 2201/5056
See application file for complete search history.

(56) References Cited

U.S. PATENT DOCUMENTS

2016/0058647 A1* 3/2016 Maddry ................ A61H 1/024
 623/26
2017/0296418 A1* 10/2017 Lee ...................... A61H 1/0281
2017/0340504 A1 11/2017 Sanz Merodio et al.
2017/0367852 A1 12/2017 Kazerooni et al.
2020/0038219 A1 2/2020 Mizera et al.

FOREIGN PATENT DOCUMENTS

| DE | 102016123797 A1 | 6/2018 |
| EP | 2942162 A2 | 11/2015 |
| WO | 2016/134103 A1 | 8/2016 |

* cited by examiner

EXOSKELETON HAVING A PNEUMATIC ACTUATOR

FIELD

The present invention relates to an exoskeleton with a pneumatic actuator.

BACKGROUND

Exoskeletons are body-worn support systems and can be used to support, strengthen, stabilize, or extend the movements of a user. In particular, the execution of movements and especially the carrying out of activities in an ergonomically unfavorable body pose are supported. To render this possible, exoskeletons often have a mechanical structure with elements coupled in series and at least one contact point to the body, at which a transmission of force takes place between the exoskeleton and the user's body. An exoskeleton generally also has at least one further contact point to the body, at which the force received at the other contact point is discharged. In this way, a flow of force parallel to the human skeletal system can be provided, which makes it possible to reduce the load on the human muscular-skeletal system at specific points.

SUMMARY

According to a first aspect, an exoskeleton comprises a first exoskeleton element, a second exoskeleton element, a first pneumatic actuator, which is mechanically connected to the first exoskeleton element and to the second exoskeleton element, and a control unit which, when controlling the first pneumatic actuator, is adapted to switch between a first active support mode and a first passive support mode, wherein the first pneumatic actuator is not vented to the environment when in the first support mode, wherein the control unit is further adapted to switch from the first passive support mode to the first active support mode when a pressure level which can be provided in the first passive support mode differs by more than a threshold value from a target pressure level which depends on executed movement or adopted pose, and to effect a discharge of compressed air to the environment, or a supply of compressed air from a compressed-air source to the first pneumatic actuator.

Herein, the term "exoskeleton", as used throughout the description and the claims is to be understood to be a mechanical structure with elements coupled in series, which is adapted to be attached to a user's body. Furthermore, the term "exoskeleton element" as used throughout the description and the claims is to be understood to be, in particular, a rigid component which is coupled in an articulated manner to a frame of the exoskeleton or another rigid component. Furthermore, the term "control unit" as used throughout the description and the claims is to be understood to be, in particular, an electronic circuit (e.g., a microcontroller or a processor) which receives status signals, e.g., from sensors, derives control signals from the status signals in accordance with a certain logic and transmits the control signals to actuators (e.g., electro-pneumatic valves, compressors etc.).

In addition, the term "pneumatic actuator" as used throughout the description and the claims is to be understood to be, in particular, an actuator which comprises a pressure chamber in which, e.g., a cylinder which can be acted upon on one or both sides is slidably mounted, whereby the supply of compressed air into the pressure chamber(s) can bring about a displacement of the cylinder and hence a performance of mechanical work. Furthermore, the term "active support mode" as used throughout the description and the claims is to be understood to be, in particular, a support mode in which compressed air is "consumed" in the sense that compressed air is discharged from the pressure chamber of the pneumatic actuator to the environment. In addition, the term "passive support mode" as used throughout the description and the claims is to be understood to be a support mode in which no compressed air is "consumed", i.e., although the compressed air may flow out of the pressure chamber of the pneumatic actuator, the compressed air is not (directly) discharged to the environment.

Furthermore, the phrase "to switch between the passive and the active support mode" as used throughout the description and the claims, particularly the ending of the passive support mode and the starting of the active support mode or the ending of the active support mode and the starting of the passive support mode, is to be understood to mean that the exoskeleton "consumes" no compressed air in certain phases in which the passive support mode is active, and "consumes" compressed air in other phases in which the active support mode is active. Notably, there is greater freedom with respect to the adjustment of the support force to a specific movement/pose in the active support mode than in the passive support mode in which the pneumatic actuator is not vented to the environment.

In addition, the term "pressure level" as used throughout the description and the claims is to be understood, in particular, to be a pressure level in a pressure chamber of the pneumatic actuator. Furthermore, the phrase "when a pressure level which can be provided in the first passive support mode differs by more than a threshold value from a target pressure level which depends on the executed movement or an adopted posture" as used throughout the description and the claims is to be understood, in particular, to be a pressure level which changes during a movement of the exoskeleton as, e.g., air is compressed or expanded in the pressure chamber, wherein a supply of air and, in particular, venting to the environment takes place when the user leaves a certain range of movement and/or the support force to be applied changes owing to external factors such as, e.g., the picking up of a weight.

In the passive support mode, no energy (in the form of compressed air) is withdrawn from the pneumatic system. Rather, energy is absorbed by energy-storage elements (compressed-air temporary storages) during certain movements and is later released. For example, during a downwards movement of the arms or the upper body, energy can be stored in a gas pressure spring and the stored energy can be returned to the body during raising of the arms or the body. In this way, the user is supported against gravity during repetitive activities and, in addition, the user's holding effort in static situations is reduced.

In the active support mode, energy (in the form of compressed air) can be supplied to the pneumatic system from outside. The force acting at a contact point between the exoskeleton and the body can be controlled (possibly dependent on a plurality of parameters) by the control unit in that compressed air is supplied to a pressure chamber, or in that compressed air is discharged from a pressure chamber. Therefore, the active support mode (as opposed to the passive support mode) is characterized by a higher level of flexibility in relation to the generation of a support force that is appropriate with regard to the user's task and that is adapted to the support situation, for example, a support force that is appropriate with regard to the activity to be carried out (picking up or releasing a light or heavy tool or object)

or to the physiological prerequisite (force curves etc.) However, for this purpose, an energy concept is required in which the pneumatic energy is not only stored (as in the passive support mode) but in which pneumatic energy is also discharged to the environment or supplied to the pneumatic system and in which the flow of energy in the pneumatic system is monitored and regulated.

The control unit is preferably adapted to connect the first pneumatic actuator to a first compressed-air temporary storage when switching to the first passive support mode.

In this way, the change in the pressure level during movements which act on the first pneumatic actuator is reduced, which can make it easier to keep the pressure level within a tolerance region around the target pressure level.

The first compressed-air temporary storage preferably comprises a greater volume than a pressure chamber of the first pneumatic actuator.

The exoskeleton preferably further comprises a third exoskeleton element, a fourth exoskeleton element, and a second pneumatic actuator, which is mechanically connected to the third exoskeleton element and to the fourth exoskeleton element, wherein the control unit is further adapted, when controlling the second pneumatic actuator, to switch between a second active support mode and a second passive support mode, wherein the second pneumatic actuator is not vented to the environment when in the second passive support mode, and wherein the control unit is further adapted to switch from the second passive support mode to the second active support mode when a pressure level which can be provided in the second passive support mode differs by more than a threshold value from a target pressure level which depends on the executed movement or adopted pose, and to effect a discharge of compressed air to the environment or to effect a supply of compressed air from a compressed air source to the second pneumatic actuator.

In this regard, it is to be noted that the target pressure level which depends on the executed movement or the adopted pose can be the same or different for the two pneumatic actuators. For example, the target pressure level (at a specific instant) can be the same for both pneumatic actuators when the second pneumatic actuator is installed "mirror symmetric" to the first pneumatic actuator and the user executes a movement or adopts a pose which is characterized by mirror symmetry in relation to the central axis of the body. However, the target pressure level can also be different for the two pneumatic actuators even when the second pneumatic actuator is installed "mirror symmetric" to the first pneumatic actuator and the user executes a movement or adopts a pose which is characterized by mirror symmetry in relation to the central axis of the body if, owing to injury, wear and tear or (severely) asymmetrically developed musculature, the user requires (substantially) more support force on one side than on the other side or if an external force is exerted on the user from one side (e.g. the weight of an object).

The control unit is preferably arranged to connect the second pneumatic actuator to a second compressed-air temporary storage when switching to the second passive support mode.

The control unit is preferably adapted, depending on the pressure levels and the target pressure levels, to feed compressed air from the first compressed-air temporary storage to the second compressed-air temporary storage and/or to feed compressed air from the second compressed-air temporary storage to the first compressed-air temporary storage.

Thus, consumption of compressed air can be reduced as compressed air is not discharged to the environment but rerouted to a compressed-air temporary storage network according to current (or future) requirements.

The control unit is preferably adapted, depending on the pressure levels and the target pressure levels, to disconnect the first pneumatic actuator from the first compressed-air temporary storage and to connect the first pneumatic actuator to the second compressed-air temporary storage and/or to disconnect the second pneumatic actuator from the second compressed-air temporary storage and to connect the second pneumatic actuator to the first compressed-air temporary storage.

This permits a further reduction in the consumption of compressed air as compressed air is not discharged to the environment but can be transferred from one pneumatic actuator to another pneumatic actuator.

The control unit is preferably adapted to control an electro-pneumatic valve through which compressed air can be supplied to the first pneumatic actuator, when in the active support mode.

For example, the pressure chamber of the first pneumatic actuator can be connected through the valve to a compressed air reservoir (which can be refilled, e.g., by means of a compressor) and so, compressed air flows from the compressed air source into the pressure chamber when the valve is opened.

The control unit is preferably adapted to adjust a first support force which is provided in the active support mode by the first pneumatic actuator to the executed movement.

The first pneumatic actuator is preferably connected to the first exoskeleton element by a non-linear mechanical transmission.

The non-linear mechanical transmission can be arranged, e.g., in such a way that in the proximity of an inoperative position (e.g., arm down) the force perceived by the user is substantially reduced while the respective pneumatic actuator is at a constant pressure level, and thus the actuator can be operated with a relatively constant pressure level over the whole movement range.

According to a second aspect, an exoskeleton comprises a first exoskeleton element, a second exoskeleton element, a gas pressure spring, which is connected to the first exoskeleton element and the second exoskeleton element and is configured to absorb and store energy during a movement assisted by gravity and to support a movement against gravity by releasing the stored energy, and a control unit which is adapted to effect a change in the support level provided by the gas pressure spring by raising or lowering the gas pressure.

The gas pressure spring is preferably connected to the first exoskeleton element by a non-linear mechanical transmission.

The support level can, preferably, be adjusted manually by a user of the exoskeleton via the control unit.

According to a third aspect, an exoskeleton comprises a plurality of exoskeleton elements, a compressor, a compressed-air storage container, a first pneumatic actuator, a second pneumatic actuator, a compressed-air temporary storage network with at least two compressed-air temporary storages, and a control unit, wherein the compressor is connected to the compressed-air storage container and is adapted to supply compressed air to the compressed-air storage container, wherein the control unit is adapted to monitor the pressure in the pneumatic actuators and the compressed-air temporary storages and, when a first support force provided by the first pneumatic actuator is to be reduced, to determine whether the first pneumatic actuator is to be vented to the environment or to the compressed-air temporary storage network, and, when a second support force provided by the second pneumatic actuator is to be increased, to determine whether compressed air from the compressed-air storage container and/or from the compressed-air temporary storage network is to be supplied to the second pneumatic actuator.

The control unit is preferably adapted, when a first support force is to be reduced and at the same time the second support force is to be increased, to cause compressed air to be supplied from the first pneumatic actuator via the compressed-air temporary storage network to the second pneumatic actuator, if a to-be-vented pressure chamber of the first pneumatic actuator is under greater pressure than a to-be-fed pressure chamber of the second pneumatic actuator.

BRIEF DESCRIPTION OF THE DRAWINGS

The invention will now be explained in the detailed description based on exemplary embodiments and with reference to drawings in which.

WAYS OF CARRYING OUT THE INVENTION

Figure 1:
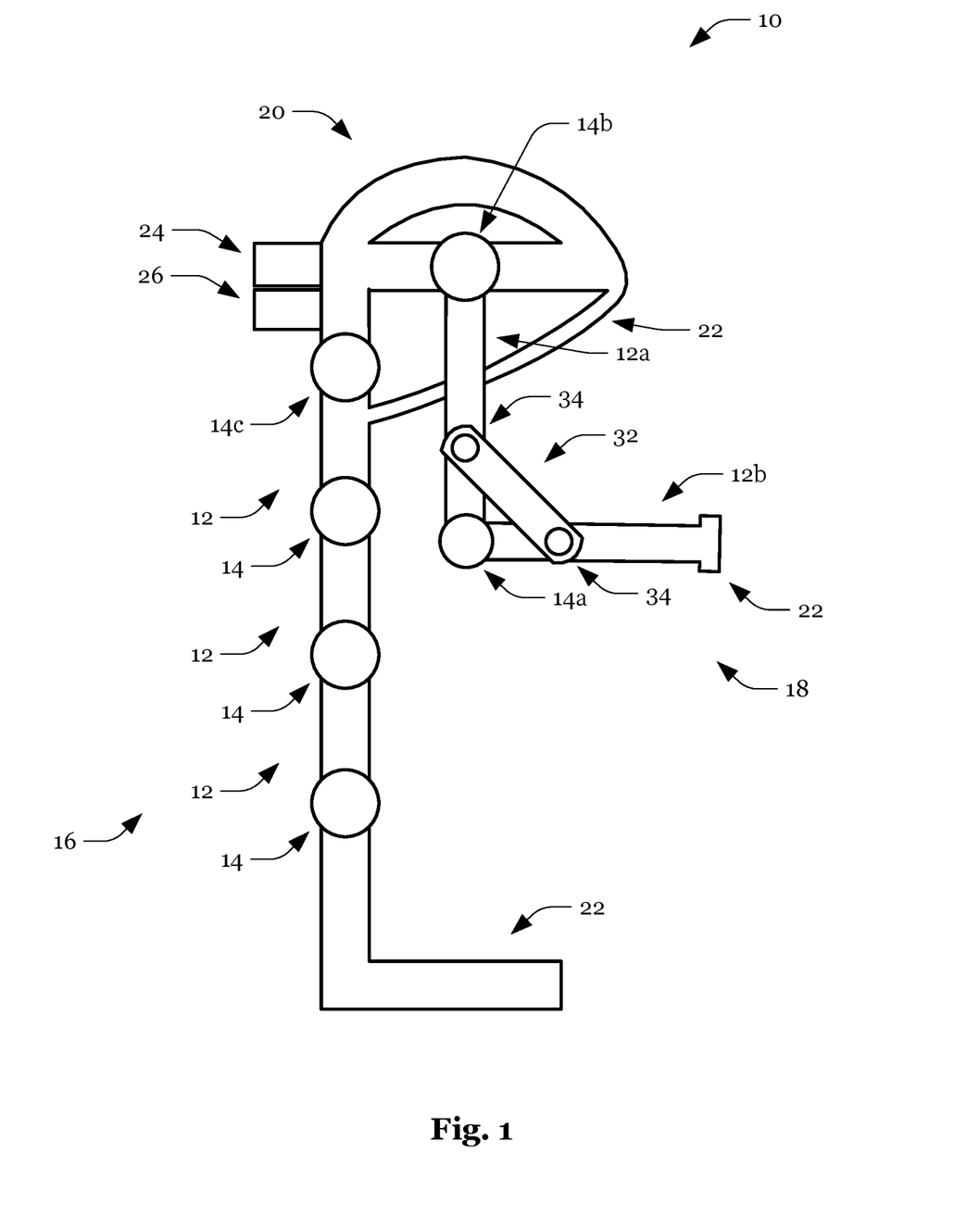
FIG. 1 shows the construction of an exemplary exoskeleton.

FIG. 1 shows an exoskeleton 10 which comprises a plurality of rigid exoskeleton elements 12 which are coupled to one another in series by connecting elements, such as, e.g., joints 14. The exoskeleton 10 is divided into a plurality of portions, wherein each portion is based on the corresponding portions of the human body in relation to the permitted/guided movements of the exoskeleton elements 12, 12a, 12b, forming the respective portion, relative to one another. Thus, the exoskeleton 10 shown in FIG. 1 is divided into a base portion 16 and an arm portion 18, which are connected to one another by a shoulder portion 20. Although not shown in FIG. 1, the exoskeleton 10 may also comprise a leg portion. Furthermore, it will be understood that an exoskeleton 10 in accordance with the invention may also comprise only one or some of the described portions and the exoskeleton 10 shown in FIG. 1 is therefore to be considered merely as an example of an exoskeleton 10.

For attaching the exoskeleton 10 to the human body, the base portion 16, the arm portion 18, and the shoulder portion 20 each comprise one or more rigid or flexible attachment elements 22 (e.g., straps) which, in use, rest against the hip/pubic bone area or the arm/shoulder/chest area of the user, or (partially) clasp or enclose the same. The position and/or size of said attachment elements 22 may be adjustable to allow adapting the exoskeleton 10 to different users.

The exoskeleton elements 12 of the base portion 16 are based on the vertebrae of the human vertebral column in relation to the permitted/guided movements of the exoskeleton elements 12, forming the base portion 16, relative to one another. To this end, the base portion 16 comprises exoskeleton elements 12 coupled in series, wherein exoskeleton elements 12 of a pair are coupled to one another via a joint 14, wherein the joint 14 is arranged to allow (or enforce) a relative movement of the exoskeleton elements 12 which corresponds to the movement of one or more corresponding vertebrae of the vertebral column of a user. Furthermore, the exoskeleton 12 may comprise one or more sensors to determine the position and/or orientation of the exoskeleton elements 12 of the base portion 16 (relative to one another and/or to a specific terrestrial or body-fixed coordinate system).

The exoskeleton elements 12a, 12b of the arm portion 18 are based on the humerus and the radius and ulna of the human skeleton in relation to the permitted/guided movements of the exoskeleton elements 12, forming the arm portion 18, relative to one another. To this end, the arm portion 18 comprises a first exoskeleton element 12a which is coupled via a first joint 14a to a second exoskeleton element 12b. The first exoskeleton element 12a is also coupled via a second joint 14b to the shoulder portion 20 which, for its part, is coupled via a third joint 14c to an exoskeleton element 12 of the base portion 16. Furthermore, the exoskeleton 12 may comprise one or more sensors to determine the position and/or orientation of the exoskeleton elements 12a, 12b of the arm portion 18 (relative to one another and/or to a specific terrestrial or body-fixed coordinate system).

Figure 2:
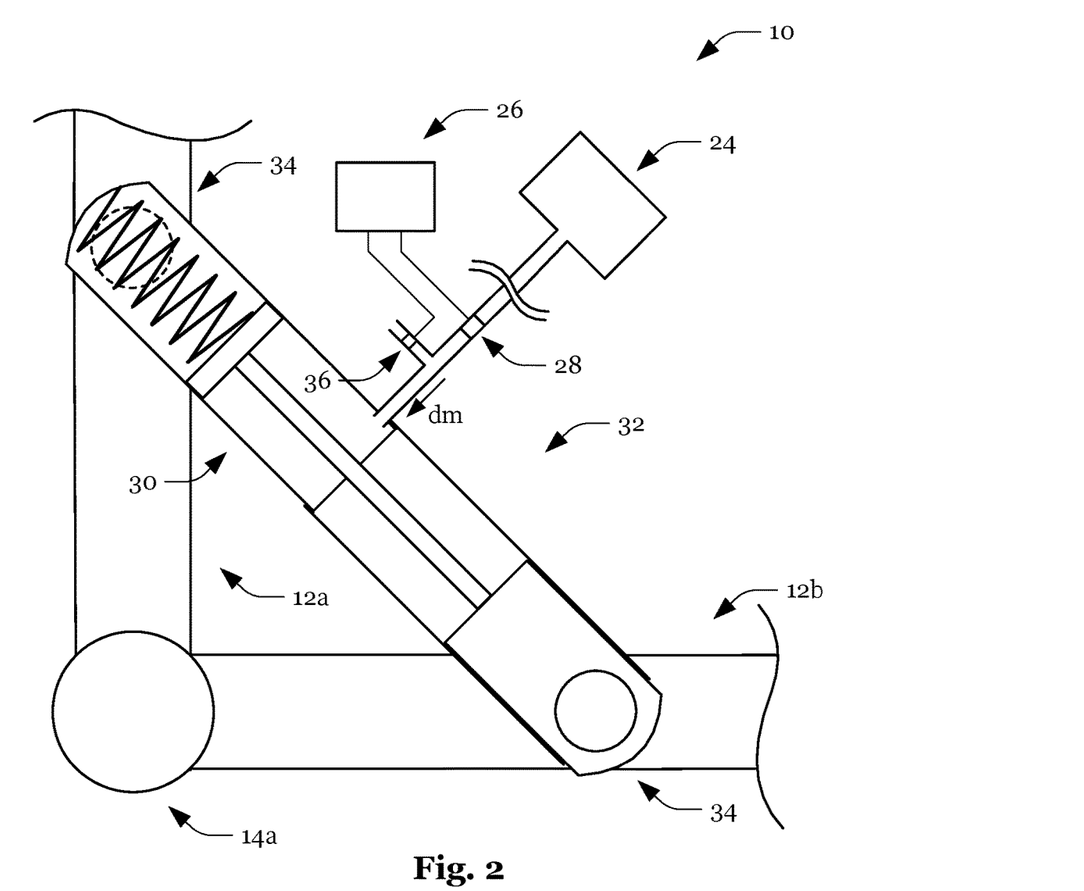
FIG. 2 and FIG. 2a illustrate the switching between the active and the passive support mode.

The exoskeleton 10 also comprises a compressed-air source 24 (e.g., a compressor or a compressed-air storage container, which may be refillable by a compressor during operation) and a control unit 26. As illustrated schematically in FIG. 2, the control unit 26 may, by controlling a first valve 28, cause compressed air (or a volume flow dm/dt), which is provided by the compressed air source 24, to be fed to the pressure chamber 30 of a first pneumatic actuator 32. Since the first pneumatic actuator 32 is mechanically connected to the first exoskeleton element 12a and to the second exoskeleton element 12b (by two joints 34), the supply of compressed air through the first valve 28 or the venting of the pressure chamber 30 through the second valve 36 can increase or reduce a force which supports bending of the arm. The control unit 26 is adapted to switch, when the first pneumatic actuator 32 is controlled, between a first active support mode A and a first passive support mode B in which the first pneumatic actuator 28 is not vented to the environment.

To this end, the control unit 26 measures the pressure level P and switches from the passive support mode B to the active support mode A when the pressure level P, which can be provided in the passive support mode B, differs by more than a threshold value Y from the target pressure level S which depends on the executed movement or the adopted pose. In the pressure level chart shown by way of example in FIG. 2a, the control unit 26 initially operates in the passive support mode B, in which the target pressure level S is determined in based on the executed movement or the adopted pose. After initially remaining in one pose, the user begins to move at t1 in that the user, for example, lowers his forearm. The lowering of the forearm reduces the target pressure level S, whereas the pressure P in the pressure chamber 30 rises as the air within the pressure chamber 30 is compressed.

Figure 2A:
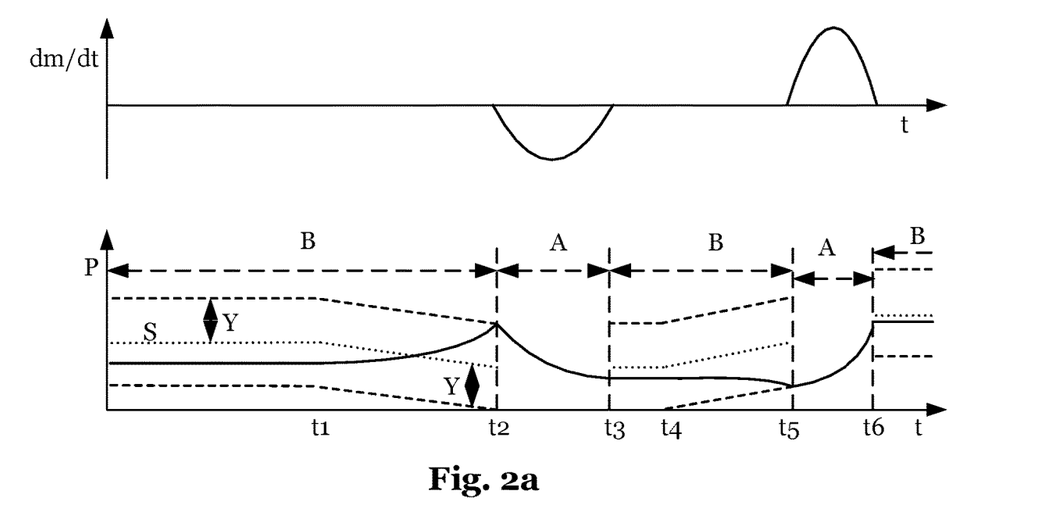

Since the pressure level P which can be provided differs at time t2, by more than the threshold value Y from the target pressure level S which depends on the executed movement or adopted pose, the control unit 26 switches to the active support mode A. In the active support mode A, compressed air is discharged to the environment through the second valve 36, whereby the pressure level P in the pressure chamber 30 is reduced. At time t3, the control unit 26 switches to the passive support mode A. When the user begins to raise his forearm at time t4, the target pressure level S increases, whereas the pressure P in the pressure chamber 30 falls as the air within the pressure chamber 30 expands. Since the pressure level P at time t5 differs by more than the threshold value Y from the target pressure level S, the control unit 26 switches to the active support mode A and feeds compressed air from the compressed air source 24 through the first valve 28 into the pressure chamber 30 of the first pneumatic actuator. At time t6, the control unit 26 switches to the passive support mode B.

Figure 3:
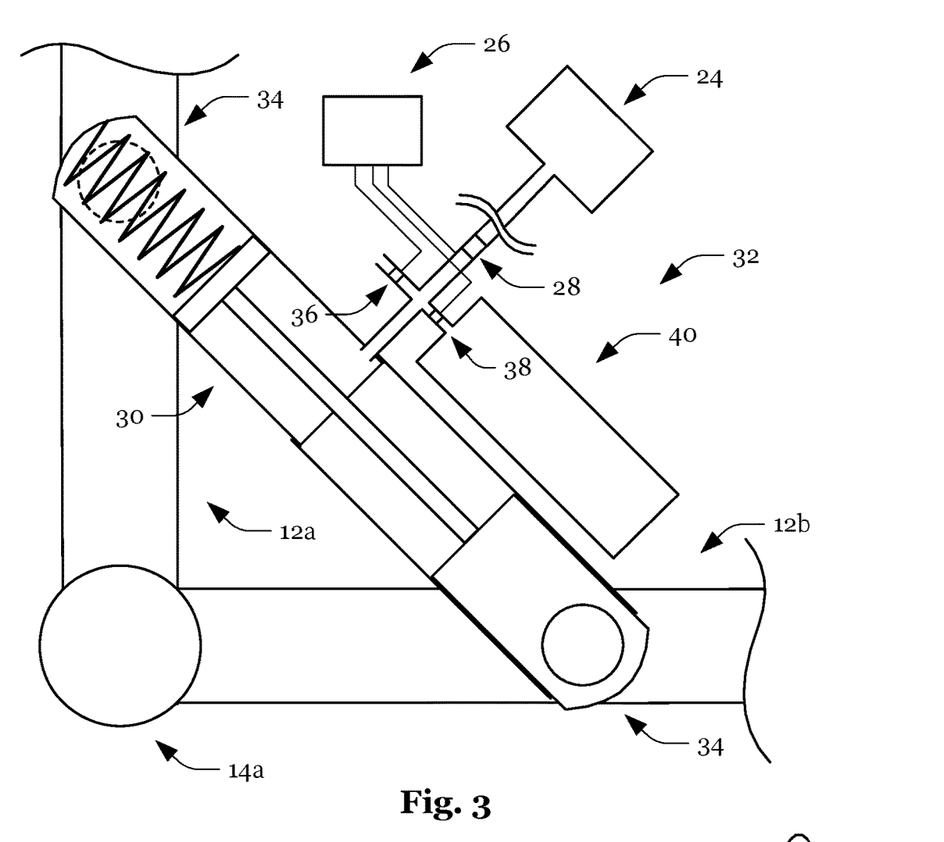
FIG. 3 and FIG. 3a illustrate the use of a compressed-air temporary storage.
Figure 3A:
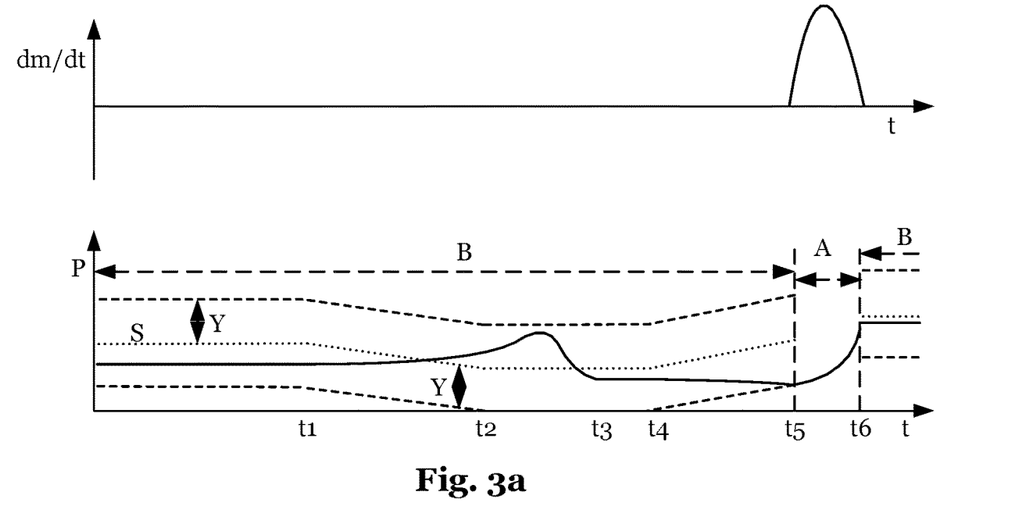

As shown in FIG. 3 and FIG. 3a, the pressure chamber 30 of the first pneumatic actuator 32 may be connected, in the passive support mode B, to a first compressed-air temporary storage 40 through a third valve 38, whereby the pressure level P changes less radically during movements by the user, and the frequency of switching to the active support mode A and/or the duration of the phases in which the active support mode is active can be reduced. Furthermore, the range of movement can be extended by a non-linear mechanical transmission as the non-linear mechanical transmission ensures that the support force acting on the user changes less radically (in percentage terms) during movements by the user than the pressure level. In the passive support mode B, the first pneumatic actuator 32 is operated as a gas pressure spring, wherein the spring constant can be adapted by connecting the pressure chamber 30 to the compressed-air temporary storages 40 but also by a temporary activation of the active support mode A.

Figure 4:
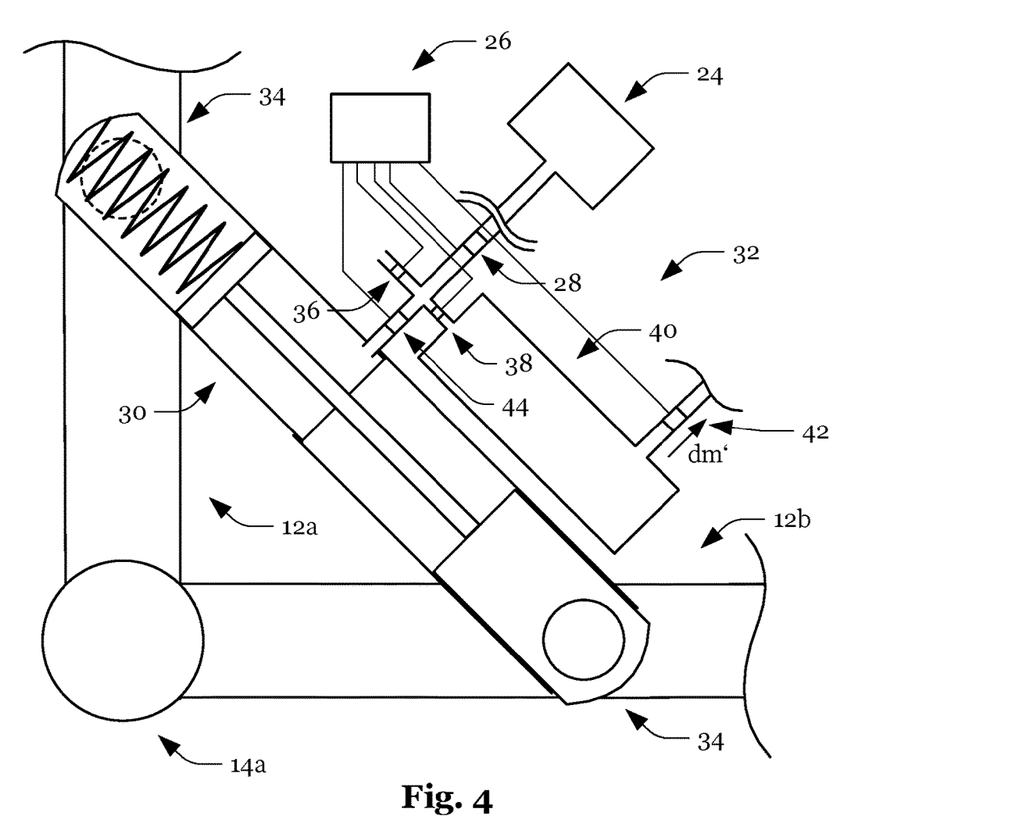
FIG. 4, FIG. 4a, FIG. 5 and FIG. 5a illustrate the use of a compressed-air temporary storage network.
Figure 4A:
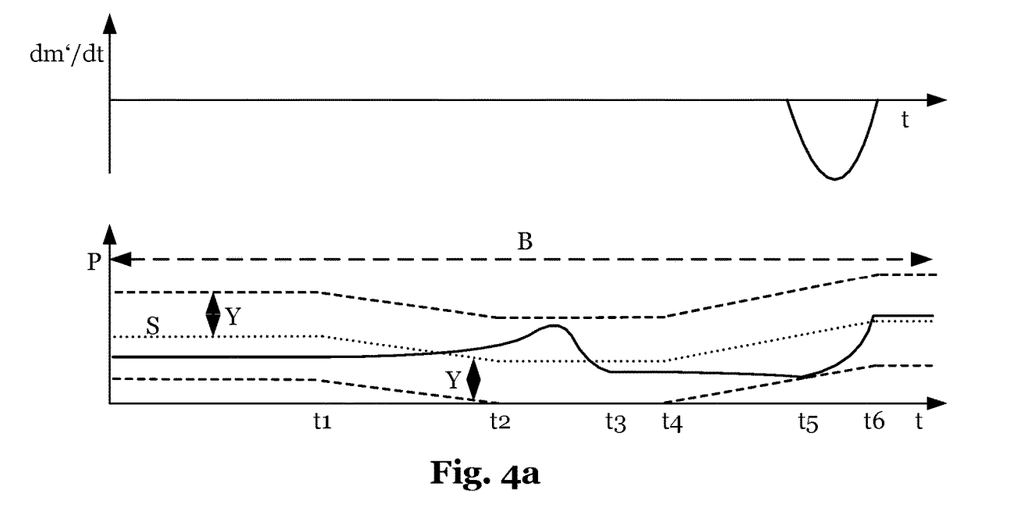

As shown in FIG. 4 and FIG. 4a, the first compressed-air temporary storage 40 can be connected through a fourth valve 42 to a second compressed-air temporary storage (not shown) or a pressure chamber of a second pneumatic actuator (not shown), whereby, instead of switching to the active support mode A, compressed air which has already been used can be rerouted or reused. In addition, in this configuration, a fifth valve 44 may be provided which makes it possible to vent the first compressed-air temporary storage 40 independently of the pressure chamber 30.

Figure 5:
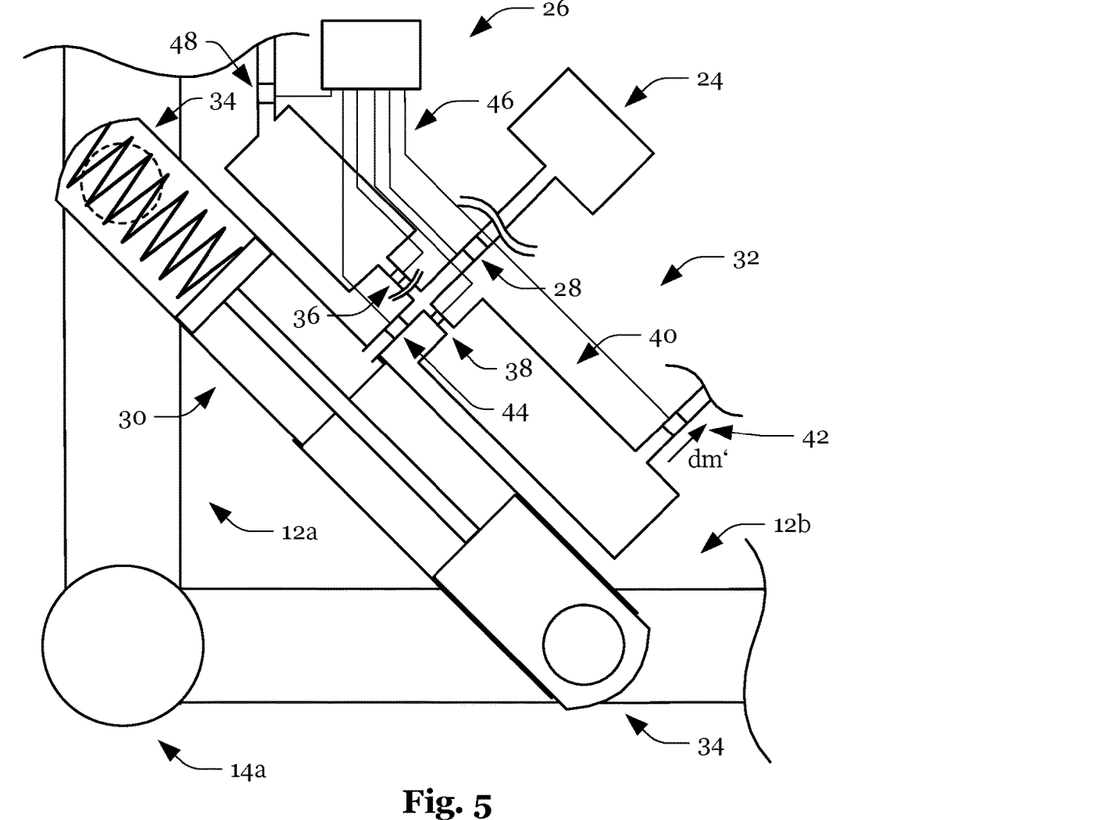
Figure 5A:
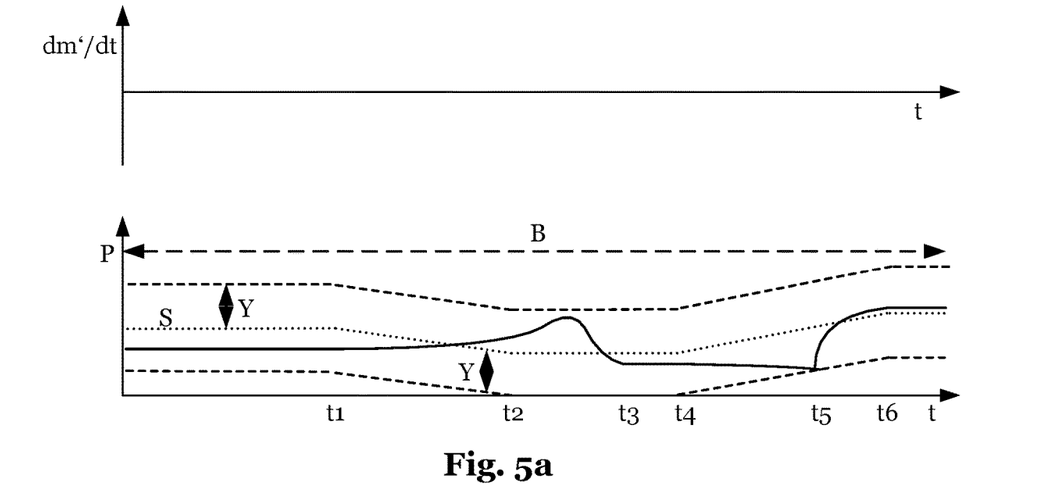

Furthermore, as shown in FIG. 5 and FIG. 5a, an arrangement of compressed-air temporary storages 40, 46 and valves 28, 26, 38, 42, 44, 48 may be provided, which permits different compressed-air temporary storages 40, 46 to be connected to a pressure chamber 30. For example, at time t5, the third valve 38 can be closed and the second valve 36 can be opened when the second compressed-air temporary storage 46 is at a higher pressure than the first compressed-air temporary storage 40.

Figure 6:
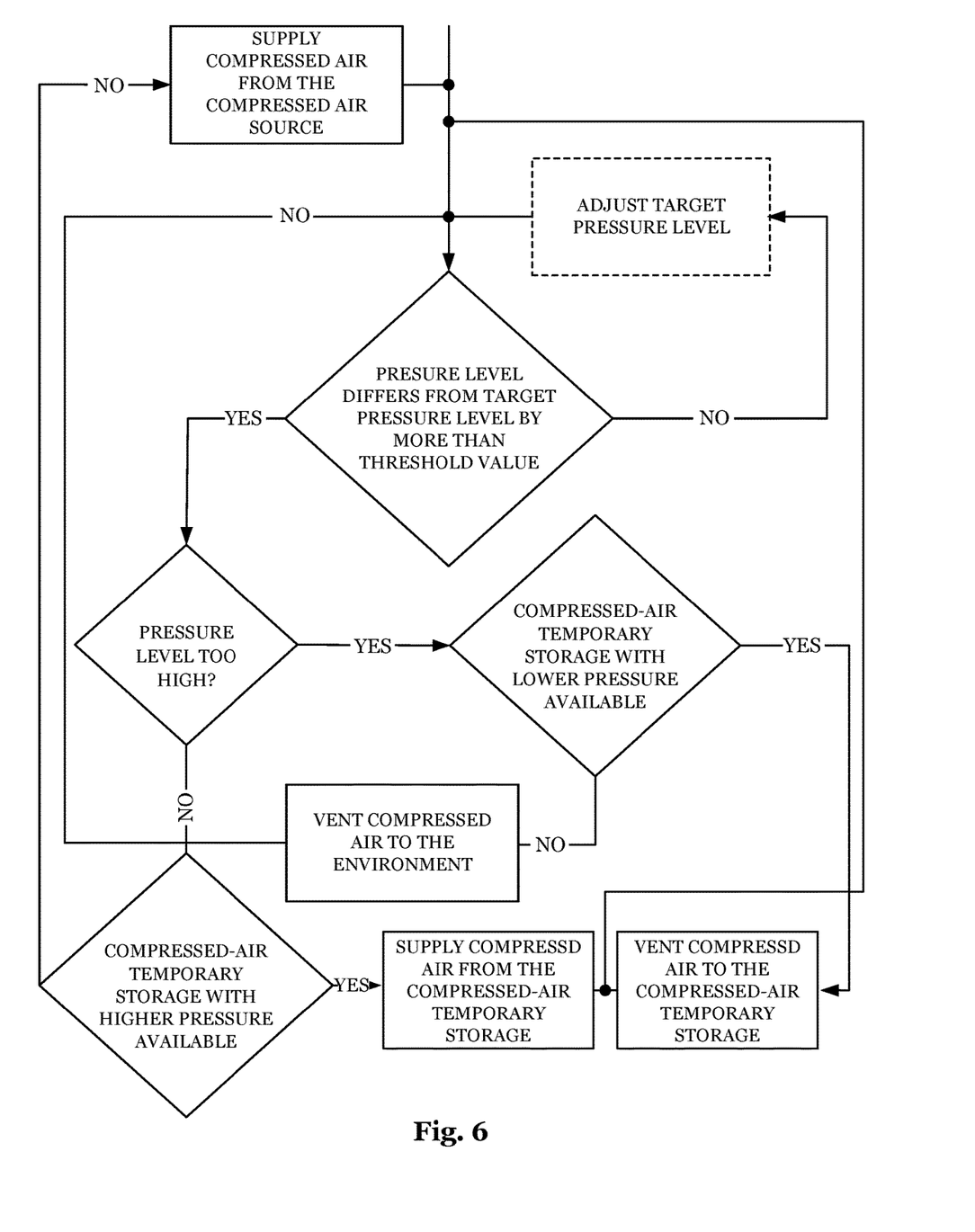
FIG. 6 shows a flow chart of a use of the compressed-air temporary storage network. In the drawings, like or functionally similar elements are identified by the same reference signs.

In this regard, FIG. 6 shows a flow chart in which, if the pressure level P differs by more than the threshold value Y from the target pressure level S, a decision is made as to whether the pressure chamber 30 is vented to a compressed-air temporary storage 40, 46 or to the environment, or as to whether compressed air is provided from a compressed-air temporary storage 40, 46 or the compressed air source 24.

LIST OF REFERENCE SIGNS 10 exoskeleton
12 exoskeleton element
12a exoskeleton element
12b exoskeleton element
14 joint
14a joint
14b joint
14c joint
16 base portion
18 arm portion
20 shoulder portion
22 attachment element
24 compressed air source
26 control unit
28 valve
30 pressure chamber
32 pneumatic actuator
34 joint
36 valve
38 valve
40 compressed air intermediate reservoir
42 valve
44 valve
46 compressed air intermediate reservoir
48 valve

The invention claimed is:

1. An exoskeleton, comprising:
a first exoskeleton element;
a second exoskeleton element;
a first pneumatic actuator which is mechanically connected to the first exoskeleton element and to the second exoskeleton element;
a control unit which, when controlling the first pneumatic actuator, is adapted to switch between a first active support mode and a first passive support mode, wherein the first pneumatic actuator is not vented to an environment when in the first passive support mode;
wherein the control unit is further adapted to switch from the first passive support mode to the first active support mode when a pressure level which can be provided in the first passive support mode differs by more than a threshold value from a target pressure level which depends on executed movement or adopted pose, and to discharge a compressed air to the environment, or to supply the compressed air from a compressed-air source to the first pneumatic actuator;
wherein the control unit is adapted to connect the first pneumatic actuator to a first compressed-air temporary storage when switching to the first passive support mode;
a third exoskeleton element;
a fourth exoskeleton element; and
a second pneumatic actuator which is mechanically connected to the third exoskeleton element and to the fourth exoskeleton element;
wherein the control unit is further adapted, when controlling the second pneumatic actuator, to switch between a second active support mode and a second passive support mode, wherein the second pneumatic actuator is not vented to the environment when in the second passive support;
wherein the control unit is further adapted to switch from the second passive support mode to the second active support mode when a second pressure level which can be provided in the second passive support mode differs by more than a second threshold value from a second target pressure level which depends on the executed movement or the adopted pose, and to discharge the compressed air to the environment or to supply the compressed air from the compressed-air source to the second pneumatic actuator;

wherein the control unit is adapted to connect the second pneumatic actuator to a second compressed-air temporary storage when switching to the second passive support mode; and wherein the control unit is adapted, depending on the pressure levels and the target pressure levels, to feed the compressed air from the first compressed-air temporary storage to the second compressed-air temporary storage and/or to feed the compressed air from the second compressed-air temporary storage to the first compressed-air temporary storage.

2. The exoskeleton of claim 1, wherein the first compressed-air temporary storage comprises a greater volume than a pressure chamber of the first pneumatic actuator.

3. The exoskeleton of claim 1, wherein the control unit is adapted, depending on the pressure levels and the target pressure levels, to disconnect the first pneumatic actuator from the first compressed-air temporary storage and to connect the first pneumatic actuator to the second compressed-air temporary storage and/or to disconnect the second pneumatic actuator from the second compressed-air temporary storage and to connect the second pneumatic actuator to the first compressed-air temporary storage.

4. The exoskeleton of claim 1, wherein the control unit is adapted to control an electro-pneumatic valve through which the compressed air can be supplied to the first pneumatic actuator, when in the active support mode.

5. The exoskeleton of claim 1, wherein the control unit is adapted to adjust a first support force, which is provided in the active support mode by the first pneumatic actuator, to the executed movement.

6. The exoskeleton of claim 1, wherein the first pneumatic actuator is connected to the first exoskeleton element by a non-linear mechanical transmission.

7. An exoskeleton, comprising:
a plurality of exoskeleton elements;
a compressor;
a compressed-air storage container;
a first pneumatic actuator;
a second pneumatic actuator;
a compressed-air temporary storage network with at least two compressed-air temporary storages; and
a control unit;
wherein the compressor is connected to the compressed-air storage container and is adapted to supply compressed air to the compressed-air storage container;
wherein the control unit is adapted to monitor a pressure in the first and second pneumatic actuators and the at least two compressed-air temporary storages; and,
when a first support force provided by the first pneumatic actuator is to be reduced, to determine whether the first pneumatic actuator is to be vented to an environment or to the compressed-air temporary storage network;
when a second support force provided by the second pneumatic actuator is to be increased, to determine whether the compressed air from the compressed-air storage container and/or from the compressed-air temporary storage network is to be supplied to the second pneumatic actuator; and
wherein the control unit is adapted, when the first support force is to be reduced and the second support force is to be increased at the same time, to cause the compressed air to be supplied from the first pneumatic actuator, via the compressed-air temporary storage network, to the second pneumatic actuator if a to-be-vented pressure chamber of the first pneumatic actuator is under greater pressure than a to-be-fed pressure chamber of the second pneumatic actuator.

8. An exoskeleton, comprising:
a first exoskeleton element;
a second exoskeleton element;
a first pneumatic actuator which is mechanically connected to the first exoskeleton element and to the second exoskeleton element;
a control unit which, when controlling the first pneumatic actuator, is adapted to switch between a first active support mode and a first passive support mode, wherein the first pneumatic actuator is not vented to an environment when in the first passive support mode;
wherein the control unit is further adapted to switch from the first passive support mode to the first active support mode when a pressure level which can be provided in the first passive support mode differs by more than a threshold value from a target pressure level which depends on executed movement or adopted pose, and to discharge a compressed air to the environment, or to supply the compressed air from a compressed-air source to the first pneumatic actuator;
wherein the control unit is adapted to connect the first pneumatic actuator to a first compressed-air temporary storage when switching to the first passive support mode;
a third exoskeleton element;
a fourth exoskeleton element;
a second pneumatic actuator which is mechanically connected to the third exoskeleton element and to the fourth exoskeleton element;
wherein the control unit is further adapted, when controlling the second pneumatic actuator, to switch between a second active support mode and a second passive support mode, wherein the second pneumatic actuator is not vented to the environment when in the second passive support;
wherein the control unit is further adapted to switch from the second passive support mode to the second active support mode when a second pressure level which can be provided in the second passive support mode differs by more than a second threshold value from a second target pressure level which depends on the executed movement or the adopted pose, and to discharge the compressed air to the environment or to supply the compressed air from the compressed-air source to the second pneumatic actuator;
wherein the control unit is adapted to connect the second pneumatic actuator to a second compressed-air temporary storage when switching to the second passive support mode; and
wherein the control unit is adapted, depending on the pressure levels and the target pressure levels, to disconnect the first pneumatic actuator from the first compressed-air temporary storage and to connect the first pneumatic actuator to the second compressed-air temporary storage and/or to disconnect the second pneumatic actuator from the second compressed-air temporary storage and to connect the second pneumatic actuator to the first compressed-air temporary storage.

\* \* \* \* \*